Figure 1:
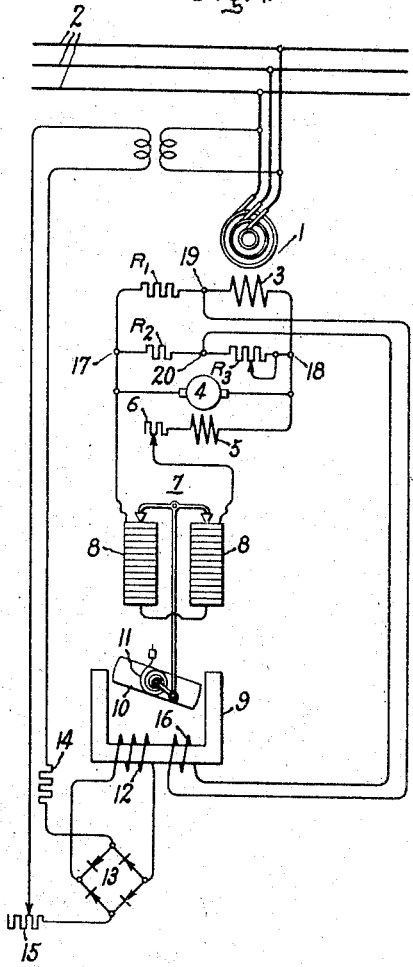

May 19, 1942.  G. H. JUMP  2,283,738

ELECTRICAL REGULATING SYSTEM

Filed March 12, 1941

Inventor:
George H. Jump,
by Harry E. Dunham
His Attorney.

Patented May 19, 1942

2,283,738

UNITED STATES PATENT OFFICE 2,283,738

ELECTRICAL REGULATING SYSTEM

George H. Jump, Newton, Mass., assignor to General Electric Company, a corporation of New York Application March 12, 1941, Serial No. 382,893

6 Claims. (Cl. 171—119)

My invention relates to electrical regulating systems and more particularly to improvements in anti-hunting means for electrical regulating systems.

Most regulating systems inherently tend to hunt or overshoot due to a time lag in the operation of the regulator. This tendency to hunt or overshoot can be reduced or eliminated by the use of a compensating means, known in the art as anti-hunting means, acting to restore the regulator to the normal position in advance of the regulated quantity thereby anticipating the change in the regulated quantity due to the time delay in the operation of the regulator. In order to accomplish this effectively it is desirable to provide means for varying the compensating effect in proportion to the rate of recovery of the regulated quantity.

In the case of a voltage regulator operating in conjunction with a generator and exciter or other source of field excitation the regulated quantity is the generator voltage and when a deviation in the voltage occurs correction is made by changing the generator field flux. The rate of recovery of the generator voltage is determined by the rate of change of the generator field flux and it is therefore proportional to the field inductive drop which is the difference between the applied field voltage and the resistance or IR drop of the field circuit. The system can be made non-hunting by applying a corrective bias to the controlling means of the regulator in proportion to this inductive drop in the generator field. Heretofore, one way this has been accomplished is by the use of a stabilizing transformer having a winding responsive to a change in the generator field current for inducing a transient voltage in another winding which applies a corrective bias to the controlling means of the regulator. While such an arrangement works in a satisfactory manner, it is necessary to match the stabilizing transformer with the generator field characteristic either by designing it for an individual application or by making difficult adjustments in the field.

An object of my invention is to provide an improved electrical regulating system.

Another object of my invention is to provide a new and improved anti-hunting means for electrical regulating systems.

A further object of my invention is to provide a novel and improved anti-hunting means which is simple in construction and can be easily adjusted to match the characteristics of the regulated apparatus.

Briefly, in accordance with my invention, I provide a novel arrangement for introducing an anti-hunting or compensating effect into a generator regulator which is proportional to the inductive drop across the generator field whereby hunting or overshooting is eliminated. This is accomplished by providing an impedance bridge circuit in the form of a Wheatstone bridge, one arm of which includes the generator field. An anti-hunting means is arranged so as to be responsive to a potential drop across the bridge which is zero under steady state conditions. However, upon a change in generator field current incident to the operation of the regulator in response to a change in the regulated condition, the resulting inductive drop across the generator field acts to unbalance the bridge whereby a potential is applied to the anti-hunting means in a direction to restore the regulator to a normal position and thereby prevent overshooting.

The novel features which I believed to be characteristic of my invention are set forth with particularity in the appended claims. My invention itself, however, both as to its organization and method of operation together with further objects and advantages thereof may be best understood by reference to the following description taken in connection with the accompanying drawing in which Fig. 1 illustrates diagrammatically an embodiment of my invention applied to a direct acting rheostatic type of voltage regulator for an alternating current generator, and Fig. 2 is a modification of the arrangement shown in Fig. 1.

Figure 2:
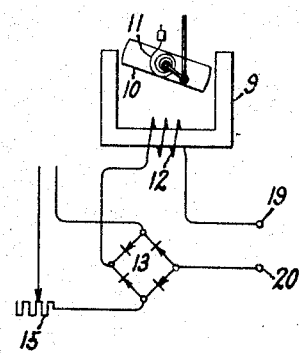

Referring to Fig. 1 of the drawing, I have shown an alternating current generator or alternator 1 which is connected to supply power to an external load circuit 2. The generator 1 is provided with a field winding 3 which is energized by a self-excited exciter 4 having a shunt field winding 5. In series with the field winding 5 of the exciter is an ordinary exciter field rheostat 6 and a variable regulating resistance 7. The regulating resistance 7 may be of any suitable type and has been shown by way of example as a compressible pile type of resistance, the resistance of which is varied by varying the force applied to the stacks 8. This force is applied through a lever system connected to an electromagnet consisting of a core 9 and a pivotally mounted armature 10. A spring 11 tends to oppose the pull of the magnet and to increase the force on the resistance stack. The core 9 is energized by a main control coil 12 which is energized in response to any suitable electrical quantity to be regulated, such as for example the voltage of generator 1. Interposed between the generator 1 and the main control coil 12 is a full wave rectifier 13 which may be of any suitable type such as the well known copper oxide variety. The usual current limiting and frequency error correcting resistor 14 is inserted in series with the alternating current input terminals of the rectifier and there is also inserted in series therewith an adjustable rheostat 15 for adjusting the voltage setting of the regulator.

For preventing hunting of the above described regulating system I provide an anti-hunting coil 16 mounted on the core of the electromagnet 9 which is connected to be energized from an impedance bridge circuit which will now be described. The generator field winding 3 and impedance elements $R_1$, $R_2$ and $R_3$ are connected in the form of a Wheatstone bridge having diagonal or non-adjacent input terminals 17 and 18 connected to be energized from any suitable source of supply such as the armature of exciter 4. The output diagonal or non-adjacent terminals 19 and 20 are connected to the anti-hunting coil 16. The impedances $R_1$, $R_2$ and $R_3$, which are preferably non-inductive, are so proportioned that when the voltage applied to the input terminals 17 and 18 is constant the bridge is balanced and a potential across the output terminals 19 and 20 is zero. When the voltage applied to the input terminals of the bridge changes, a transient potential appears across the output terminals 19 and 20 due to the inductance effect of the field winding 3 which causes the bridge to become temporarily unbalanced. The impedance $R_3$ is illustrated as adjustable to facilitate the balancing of the bridge.

In operation the regulator acts to maintain the voltage of the generator 1 at a predetermined value by automatically adjusting its excitation. Thus if the voltage of generator 1 increases above normal more current flows through the main coil 12 of the electromagnet 9 causing the armature 11 to rotate in a counter-clockwise direction against the force of spring 11 decreasing the force applied to the stacks 8 of the regulating resistance 7 and increasing its resistance. This decreases the field current and armature voltage of the exciter whereby the generator voltage and excitation decreases and the alternator voltage is returned to normal. Similarly, if the alternater voltage falls below the normal value the current in the regulator coil 12 and the magnetic pull on the armature 11 decreases so that the armature rotates in a clockwise direction under the influence of spring 11 to decrease the resistance of the regulating resistance 7 and increase the exciter voltage and alternator excitation whereby the alternator voltage returns to normal. When the regulator responds to a change in voltage at the terminals of generator 1 to increase or decrease the voltage of exciter 4, as the case may be, the current in the path including the impedance elements $R_2$ and $R_3$ changes more rapidly than the current in the parallel path including the impedance $R_1$ and the generator field 3 due to the difference of the inductance values of these parallel paths caused by the inductance of the generator field. This causes a transient unbalance of the bridge circuit whereby a voltage, determined by the difference between the voltages across $R_1$ and $R_2$, appears across the output terminals 19 and 20, and a current then flows in the anti-hunting coil 16. If the voltage of the generator 1 decreases, the current in the coil 12 and the flux produced thereby decreases as has been previously described. This causes the regulator to increase the exciter voltage. Under these conditions the polarity of the voltage appearing across the terminals 19 and 20 is such as to cause a current to flow in the anti-hunt coil 16 in a direction to produce a flux augmenting the flux produced by the main coil 12. Consequently due to the modifying action of the anti-hunt coil the regulator tends to come back to its steady-state equilibrium condition before the regulating change has been completed thereby preventing overshooting. Similarly, when the voltage of generator 1 increases above normal the decrease in exciter voltage causes a voltage of opposite polarity to appear across the terminals 19 and 20 whereby the current in the anti-hunt coil 16 produces a flux in opposition to that produced by the main coil 12 and the spring 11 returns the regulator to its equilibrium position before the regulating change has been completed.

In the modification illustrated in Fig. 2 of the drawing the anti-hunt coil 16 is eliminated and the output terminals 19 and 20 of the bridge are connected in series with the energizing circuit of the coil 12 of the regulator. Otherwise, the arrangement is the same as illustrated in Fig. 1. In operation, the anti-hunting potential appearing across the bridge output terminals 19 and 20 acts to buck or boost the output voltage of the rectifier 13 and thereby acts to modify the action of the regulator to prevent overshooting. In this arrangement the polarities are such that when the generator voltage decreases below normal the anti-hunt potential acts to boost the rectifier output voltage but when the generator voltage rises above normal the anti-hunt potential acts to buck the rectifier output voltage.

My anti-hunting arrangement has the advantage that the biasing effect introduced into the regulator for stabilizing is in accurate proportion to the actual inductive drop in the generator field circuit which is in turn a measure of the rate of flux change or the rate of recovery of the generator voltage. This is the desired condition, since as pointed out before, for maximum stability the compensating or anti-hunting effect should be in proportion to the rate of recovery of the regulated quantity, which in the illustrated embodiment is the generator voltage. My improved regulating apparatus has the additional advantage that it is very simple and inexpensive and can be easily and quickly adjusted to operate with any dynamo-electric machine, it being only necessary to adjust the variable impedance $R_3$ so that the voltage drop across the terminals 19 and 20 is zero under steady-state conditions.

Although I have shown my invention by way of example as applied to a voltage regulator for an alternating current generator, it should be understood that so far as my anti-hunting circuit is concerned it is equally applicable to a regulator of any suitable quantity.

While I have shown and described particular embodiments of my invention, it will occur to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, a dynamo electric machine having a field winding, a plurality of impedance elements, said elements and said winding being connected in the form of a Wheatstone bridge having non-adjacent input and output terminals, a source of variable voltage connected to said input terminals, means responsive to an operating condition of said machine controlled by the energization of said field winding for varying said voltage, and means responsive to the potential across said output terminals for modifying the action of said first mentioned means.

2. The combination with a dynamo electric machine having an operating condition to be regulated, of a field winding whose energization controls said condition, a plurality of non-inductive impedance elements, said elements and said field winding being connected in the form of a Wheatstone bridge having non-adjacent input and output terminals, a source of supply connected to said input terminals for energizing said field winding, regulating means for controlling the voltage of said source of supply in accordance with variations in said condition, and anti-hunting means for modifying the action of said regulating means in accordance with the potential across said output terminals.

3. The combination with a dynamo electric machine having an operating condition to be regulated, of a field winding whose energization controls said condition, a plurality of non-inductive impedance elements, said elements and said field winding being connected in the form of a Wheatstone bridge having non-adjacent input and output terminals, a source of supply connected to said input terminals for energizing said field winding, regulating means comprising an electromagnet and an operating winding associated therewith for controlling the voltage of said source of supply, said operating winding being energized in accordance with variations in said condition, and an anti-hunt winding associated with said electromagnet connected to said output terminals.

4. The combination with a dynamo electric machine having an operating condition to be regulated, of a field winding whose energization controls said condition, a plurality of non-inductive impedance elements, said elements and said field winding being connected in the form of a Wheatstone bridge having non-adjacent input and output terminals, a source of supply connected to said input terminals for energizing said field winding, regulating means for controlling the voltage of said source of supply, said regulating means having a main control coil, means for energizing said coil in accordance with said condition to be regulated, and means for introducing between said coil and said energizing means an anti-hunting potential variable in accordance with the potential across said output terminals.

5. In a regulating system, a regulator having control means arranged to act in response to variations in a condition to be regulated, a winding for controlling said condition, a plurality of non-inductive impedance elements, said impedance elements and said winding being connected in the form of a Wheatstone bridge having non-adjacent input and output terminals, a source of supply connected to said input terminals, said regulator acting to control the voltage of said source of supply, and means for modifying the action of said regulator in accordance with the potential across said output terminals.

6. The combination with a dynamo-electric machine having an operating condition to be regulated, of a field winding whose energization controls said condition, a source of voltage connected to said field winding, regulating means for controlling said source of voltage in accordance with variations in said condition, a branch path connected in parallel with said field winding, said branch path and said field winding having different inductance values, means for producing a voltage proportional to the current in said field winding, means for producing a voltage proportional to the current in said branch path, and means for modifying the action of said regulating means in accordance with the difference between said last mentioned two voltages.

GEORGE H. JUMP.